(12) United States Patent
Hödlmoser et al.

(10) Patent No.: US 12,190,611 B2
(45) Date of Patent: Jan. 7, 2025

(54) COMPUTER-IMPLEMENTED METHOD FOR GENERATING A ZONE OF ATTENTION

(71) Applicant: emotion3D GmbH, Vienna (AT)

(72) Inventors: Michael Hödlmoser, Schörfling (AT); Thomas Lang, Vienna (AT)

(73) Assignee: emotion3D GmbH, Vienna (AT)

( * ) Notice: Subject to any disclaimer, the term of this patent is extended or adjusted under 35 U.S.C. 154(b) by 0 days.

(21) Appl. No.: 18/289,388

(22) PCT Filed: Apr. 26, 2022

(86) PCT No.: PCT/AT2022/060129
§ 371 (c)(1),
(2) Date: Nov. 3, 2023

(87) PCT Pub. No.: WO2022/232854
PCT Pub. Date: Nov. 10, 2022

(65) Prior Publication Data
US 2024/0273923 A1 Aug. 15, 2024

(30) Foreign Application Priority Data
May 5, 2021 (AT) .................. A50345/2021

(51) Int. Cl.
*G06V 20/59* (2022.01)
(52) U.S. Cl.
CPC .................. *G06V 20/597* (2022.01)

(58) Field of Classification Search
CPC ........ G06V 20/597; G06V 20/59; G06T 7/70; B60W 40/08
See application file for complete search history.

(56) References Cited

U.S. PATENT DOCUMENTS

| | | | |
|---|---|---|---|
| 10,752,253 B1 * | 8/2020 | Nath | B60W 50/14 |
| 11,794,753 B2 * | 10/2023 | Arora | B60W 50/14 |
| 2017/0108925 A1 | 4/2017 | Mueller | |
| 2021/0357670 A1 * | 11/2021 | Wu | G06V 20/56 |

FOREIGN PATENT DOCUMENTS

| | | |
|---|---|---|
| DE | 102013019117 | 5/2015 |
| DE | 102015204281 | 9/2016 |
| DE | 102015220398 | 4/2017 |
| DE | 102018208402 | 11/2019 |

OTHER PUBLICATIONS

Internationaler Recherchenbericht und Schriftlicher Bescheid [International Search Report and the Written Opinion] Dated Jul. 4, 2022 From the International Searching Authority Re. Application No. PCT/AT2022/060129 and Its Translation of Search Report Into English. (14 Pages).

(Continued)

*Primary Examiner* — Boubacar Abdou Tchoussou

(57) ABSTRACT

A computer-implemented method for generating a geometric attention zone (1) for at least one person in a three-dimensional space (2), comprising a single image capturing unit (3), a data processing unit (4), a database (5) and a display unit (6), as well as a computer-readable storage medium and a device for executing such a method.

8 Claims, 5 Drawing Sheets

(56) References Cited

OTHER PUBLICATIONS

Vorbescheid [Preliminary Decision] Dated Jan. 21, 2022 From the Österreichisches Patentamt, Gruppe Erfindungen [Austrian Patent Office, Invention Group] Re. Application No. A 50345/2021. (6 Pages).

Mardanbegi "Resolving Target Ambiguity in 3D Gaze Internaction Through VOR Depth Estimation", CCS '18, Proceedings of the 2018 ACM SIGSAC Conferenceon Computer and Communications Security, XP058635525, Chi 2019, Glasgow, Scotland, UK, May 4-9, 2019, Paper 612: 1-12, May 4, 2019.

Pichitwong et al. "An Eye-Tracker-Based 3D Point-of-Gaze Estimation Method Using Head Movement", IEEE Access, XP011737980, 7: 99086-99098, Jul. 16, 2019.

Vicente et al. "Driver Gaze Tracking and Eyes Off the Road Detection System", IEEE Transactions on Intelligent Transportation Systems, XP011664673, 16(4): 2014-2027, Published Online Mar. 3, 2015.

Wang et al. "Continuous Driver's Gaze Zone Estimation Using RGB-D Camera", Sensors, XP055934103, 19(6): 1287-1-1287-22, Mar. 14, 2019.

\* cited by examiner

COMPUTER-IMPLEMENTED METHOD FOR GENERATING A ZONE OF ATTENTION

RELATED APPLICATIONS

This application is a National Phase of PCT Patent Application No. PCT/AT2022/060129 having International filing date of Apr. 26, 2022, which claims the benefit of priority of Austria Patent Application No. A50345/2021 filed on May 5, 2021. The contents of the above applications are all incorporated by reference as if fully set forth herein in their entirety.

FIELD AND BACKGROUND OF THE INVENTION

The invention relates to a computer-implemented method for generating a geometric attention zone in a three-dimensional space.

It is known from the prior art to use image-based methods to determine the attention of a person by analysing a person's gaze direction. This can be achieved, for example, by extracting the head orientation or the eye position from photographs or videos of the person. By classifying the gaze direction into predefined areas, an attention level can be calculated. Such attention modelling is mainly used in the automotive sector, but also in other human-machine applications. In a vehicle, it can be used to determine whether people are paying attention to the traffic or are distracted. In shops, it can be used to identify which products attract more or less attention. In robotics, a person's gaze direction can be used to control machines.

To classify a person's gaze direction, the person's field of vision needs to be divided into attention zones. Since these attention zones must be valid in three-dimensional space, they are usually defined by means of polygons in three-dimensional space, i.e. they comprise three or more defined points with x, y and z coordinates spanning an area. After dividing the person's field of vision into such attention zones, each gaze direction of the person can be assigned to a defined attention zone.

One problem, however, is that the image capturing unit, which is supposed to analyse the person's gaze direction, must necessarily be directed at the person, and thus cannot simultaneously capture the person's field of vision. In order to capture the person's field of vision as well, two or more image capturing units are required.

If the gaze direction of a person is extracted from the images of the image capturing unit, the problem also arises that the same gaze directions of different analysed persons do not necessarily mean that these persons are also looking at the same zones in the space. For example, the driver and passenger in a vehicle may have identical gaze directions but focus on completely different areas due to their different seating positions.

Therefore, in the prior art, additional sensors are regularly used which have the attention zones in the field of vision and are linked to the image capturing unit which captures the person, so that a direct geometric relationship is established between the person's gaze direction and the attention zones. These additional sensors are installed next to or behind the person, for example, so that attention zones can be defined for each individual person. One object of the invention is to improve these methods known from the prior art and, in particular, to enable the creation of geometric attention zones without the use of additional sensors.

These and other objects of the invention are solved by a computer-implemented method and a device according to the independent claims.

SUMMARY OF THE INVENTION

A computer-implemented method according to the invention for generating a geometric attention zone for at least one person in a three-dimensional space uses a single image capturing unit arranged in the space, a data processing unit, a database and a display unit.

The three-dimensional space may be the interior of a vehicle; however, the method according to the invention is not limited to vehicles.

The image capturing unit, data processing unit and database may be arranged preferably entirely in a vehicle. However, it may also be provided that the data processing unit and the database are arranged in the vehicle and communicate via an interface, for example a wireless connection, with an external server, for example an Internet server, on which there may be a database with previously stored and/or continuously supplemented reference data which are used to process the captured data.

The image capturing unit may be a photo or video camera designed to capture two- or three-dimensional photographs or videos. In particular, it may be a TOF (Time-of-Flight) camera or the like. The use of a TOF camera facilitates robust detection of people and extraction of gaze direction. However, a conventional 2D camera in combination with a previously stored 3D model of the person or the person's face can also enable robust extraction of the gaze direction from 2D individual images. The image capturing unit may preferably be arranged in a vehicle in such a way that, if possible, the entire interior, at least all passenger's seats, but at least the driver's and passenger's seats are visible in the image area.

The data processing unit may be designed as a microcontroller or microcomputer and comprise a central processing unit (CPU), a volatile semiconductor memory (RAM), a non-volatile semiconductor memory (ROM, SSD hard disk), a magnetic memory (hard disk) and/or an optical memory (CD-ROM) as well as interface units (Ethernet, USB) and the like. The database may be provided as a software module in the data processing unit, in a computer separate from the data processing unit or in an external server. The components of such data processing units are generally known to the skilled person.

A method according to the invention comprises at least the following steps:

Initially, the person is asked by the display unit to fixate the vertices of a certain attention zone by head and/or eye movements. The attention zone may, for example, be polygons corresponding to the position of the windscreen, dashboard, side windows or side mirrors of a vehicle. However, they may also be polygons that define the display windows of a shop in a shopping street or the display panel of a technical device in a production plant.

The image capturing unit then captures a number N of consecutive first photographs of the space with the person over a predetermined period of time and transmits them to the data processing unit. The number N designates the number of vertices of the polygon defining the attention zone. The number N may be equal to one if the shape and extent of the attention zone is predefined. However, the number N may also be greater than or equal to three. Preferably, N is equal to four in the case of rectangular or trapezoidal attention zones. Instead of capturing N consecutive photographs, the image capturing unit may also capture a short video of the space. The data processing unit analyses the first photographs or video, detects the person therein and determines a number N of first gaze direction vectors $BV_1$-$BV_N$ of this person. The N first gaze direction vectors BV1-BVN are directed by the person to the vertices of the relevant attention zone and are defined, for example, as vectors in three-dimensional Cartesian coordinates or in polar coordinates.

The determination of the gaze direction vectors of the at least one person from the photographs or video may be performed by extracting and analysing the head orientation and/or eye position of the person. Such methods for determining the gaze direction vectors of a person from a photograph or video of the person are known in principle; known image processing algorithms may be used for this purpose. In particular, image analysis libraries in the database and/or a detector trained with training examples, for example a neural network, may be referred to.

Furthermore, the data processing unit may extract the gaze direction vectors of several persons (for example, the driver and the passenger) from a single photograph series or a single video.

As a result, the display unit issues a prompt to the person to change their position in the space. For example, the person may move their seat back, forward, up or down, or lean forward or back. Afterwards, the display unit prompts the person to fixate the vertices of the attention zone again by head and/or eye movements.

In the next step, the image capturing unit takes a number N of second photographs of the space with the person and transmits the photographs to the data processing unit. Again, instead of photographs, a video may be recorded over a short period of time. The number N may be equal to or greater than one—so it may also be provided that the person already changes his position after every single fixation of a vertex and is asked to fixate another vertex.

The data processing unit again extracts a number N of second three-dimensional gaze direction vectors $BV_1'$-$BV_N'$ of the person. Due to the different position of the person, the second gaze direction vectors $BV_1'$-$BV_N'$ differ from the first gaze direction vectors $BV_1$-$BV_N$.

Next, the data processing unit superimposes the gaze direction vectors $BV_1$-$BV_N$ on the gaze direction vectors $BV_1'$-$BV_N'$ to determine N three-dimensional intersection points $P_1$-$P_N$ by triangulation. These N intersections correspond to the vertices of the attention zone in a mutual three-dimensional coordinate system of the space. The N intersections $P_1$-$P_N$ are stored in the database as vertices of the attention zone.

The method may also be performed with more than two different positions of the person to increase the accuracy of the triangulation.

For example, it may be provided that the person is first requested to move their seat all the way down, then to move their seat all the way up, then to move their seat all the way forward, and finally to move their seat all the way back, whereby after each change in position N gaze direction vectors are determined, which are then used to calculate the exact intersection points $P_1$-$P_N$.

The advantage of the present invention is that no additional sensors or image capturing units are required to create the configuration of the attention zones. It is enough to use the image capturing unit that is directed at the person to be analysed anyway. It is not necessary to take a picture of the person from behind.

This allows a fast and flexible configuration of the attention zones, which ensures a faster conversion or installation of the complete system into an existing image capturing and image analysis system. No installation of new hardware is necessary.

According to the invention, it may be provided that the method is repeated to create multiple attention zones of a single person. For example, it may be provided that after performing the method according to the invention, the person is now requested to fixate the vertices of another attention zone.

According to the invention, it may be provided that the method is repeated to create several attention zones of different persons. For example, it may be provided that all detected persons, after the method according to the invention has been performed, are now requested to fixate the vertices of another attention zone.

According to the invention, it may be provided that after generating and storing one or more attention zones of at least one person, the image capturing unit continuously detects the gaze direction vectors of this person and transmits them to the data processing unit, and the data processing unit continuously checks whether the detected gaze direction vectors fall under one of the stored attention zones or not. This allows monitoring of the person's attention during operation.

According to the invention, it may be provided that the data processing unit calculates a degree of attention of at least one person by determining the frequency with which the detected gaze direction vectors of this person fall under one of the stored attention zones per unit of time. It may be provided that the display unit issues a warning message when the level of attention drops below a predetermined threshold. For example, a threshold may be defined according to which the person looks at least once per second into the attention zone defined by the windscreen.

The invention further relates to a computer-readable storage medium comprising instructions for causing a data processing unit to perform a method according to the invention.

The invention further relates to a device for generating a geometric attention zone for at least one person in a three-dimensional space, comprising a single image capturing unit, a data processing unit, a database and a display unit, wherein the device is adapted to perform a method according to the invention.

According to the invention, it may in particular be provided that the space is the interior of a vehicle and the image capturing unit is arranged in front of a driver's seat or in front of a passenger's seat in the direction of travel of the vehicle and preferably centrally above a windscreen or above the dashboard of the vehicle.

Further features according to the invention result from the claims, the exemplary embodiments and the figures.

BRIEF DESCRIPTION OF THE SEVERAL VIEWS OF THE DRAWINGS

In the following, the invention is explained detail of a non-exclusive exemplary embodiment.

DESCRIPTION OF SPECIFIC EMBODIMENTS OF THE INVENTION

Figure 1:
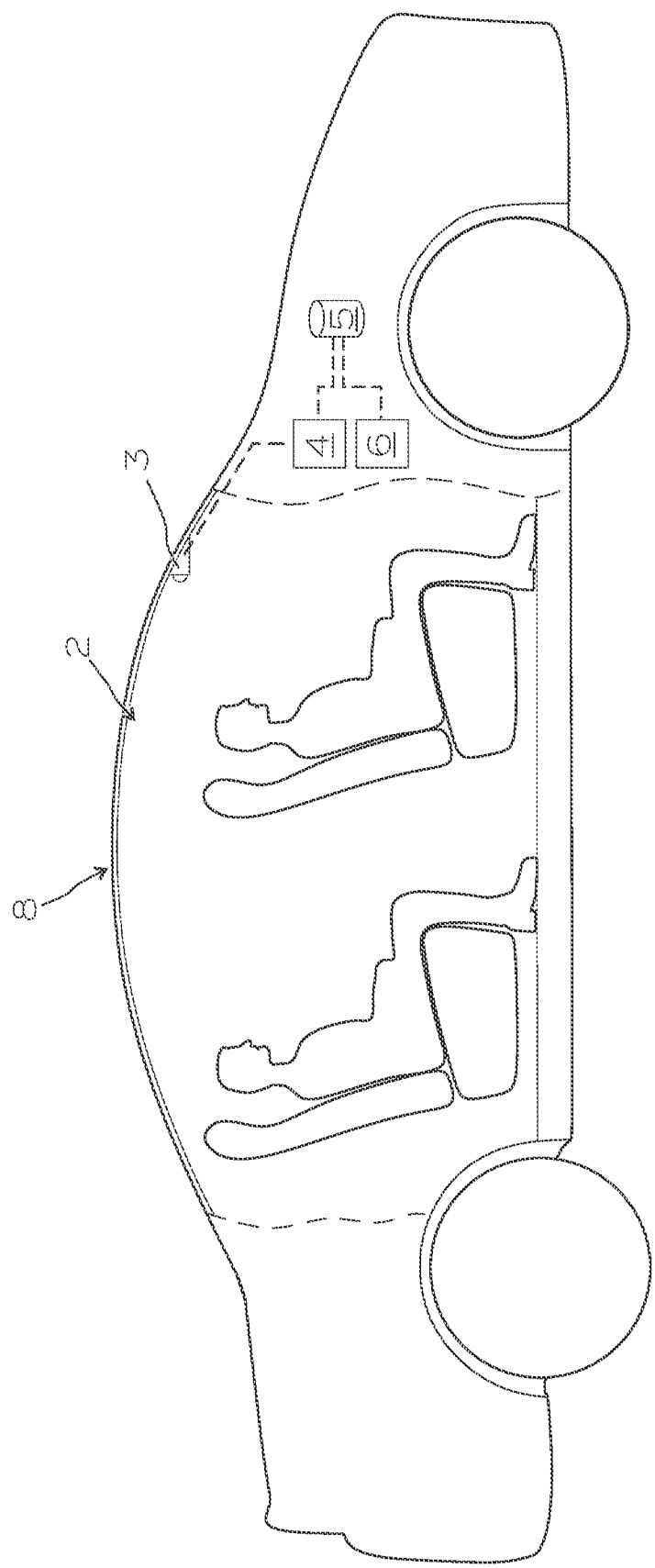
FIG. 1 shows a schematic representation of a vehicle with a data processing unit for performing a method according to the invention.

FIG. 1 shows a schematic representation of a vehicle 8 with an electronic data processing unit 4 integrated therein for performing a method according to the invention. In the interior 2 of the vehicle 8, an image capturing unit 3 in the form of a camera is arranged on the ceiling. The camera is configured and arranged in such a way that it can capture the interior 2 of the vehicle 8, namely at least the two front seats and persons located therein. In the interior, several people are seated in two rows. In this embodiment, the vehicle is configured to be a passenger car. The data processing unit 4 is connected to a database 5 and has interfaces (not shown) for communication with external electronic components. Furthermore, a display unit 6 is provided, which is also connected to the data processing unit 4. The display unit 6 is arranged in the dashboard of the vehicle 8.

Figure 2:
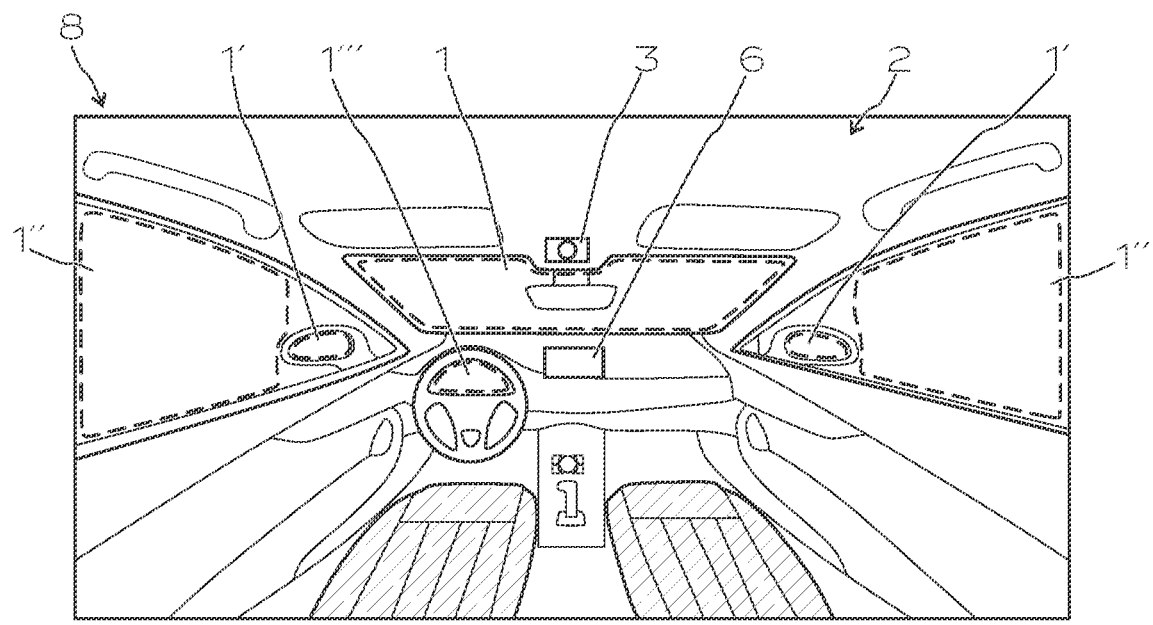
FIG. 2 shows schematic examples of various attention zones according to the invention in a vehicle.

FIG. 2 shows schematic examples of various attention zones 1, 1', 1", 1''' in the interior 2 a vehicle 8 according to the invention.

In this example, the windscreen forms the first attention zone 1, the two side mirrors the second attention zones 1', the two side windows the third attention zones 1" and the dashboard the fourth attention zone 1. Furthermore, the image capturing unit 3 is shown in the form of a video camera arranged centrally above the windscreen. The display unit 6 is shown as a centrally located touch screen.

FIGS. 3a-3d show schematic representations of the interior of a vehicle while a method according to the invention is being performed.

Figure 3A:
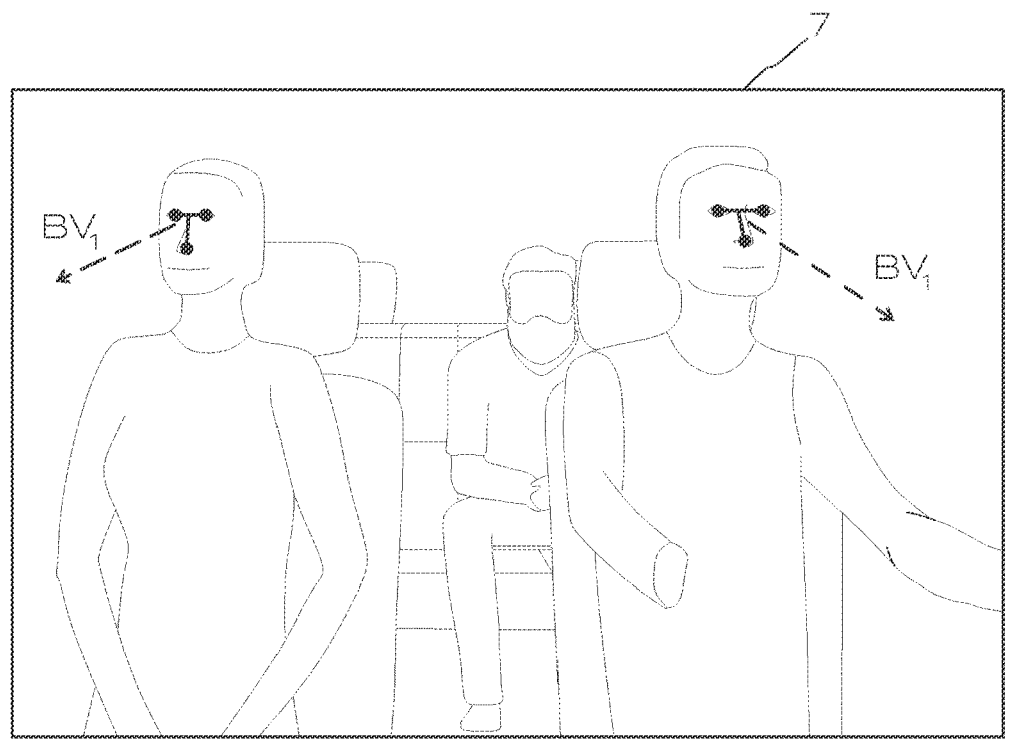
FIGS. 3a-3d show schematic representations of the interior of a vehicle while a method according to the invention is being performed.

FIG. 3a shows a photograph 7 of the interior 2 with three persons, whereby the gaze directions of the driver and the passenger have been extracted as gaze direction vectors $BV_1$. The persons were asked to focus on a vertex $P_1$ of an attention zone 1. The extraction of the gaze direction vectors of the two persons can be carried out substantially simultaneously or separately.

Figure 3B:
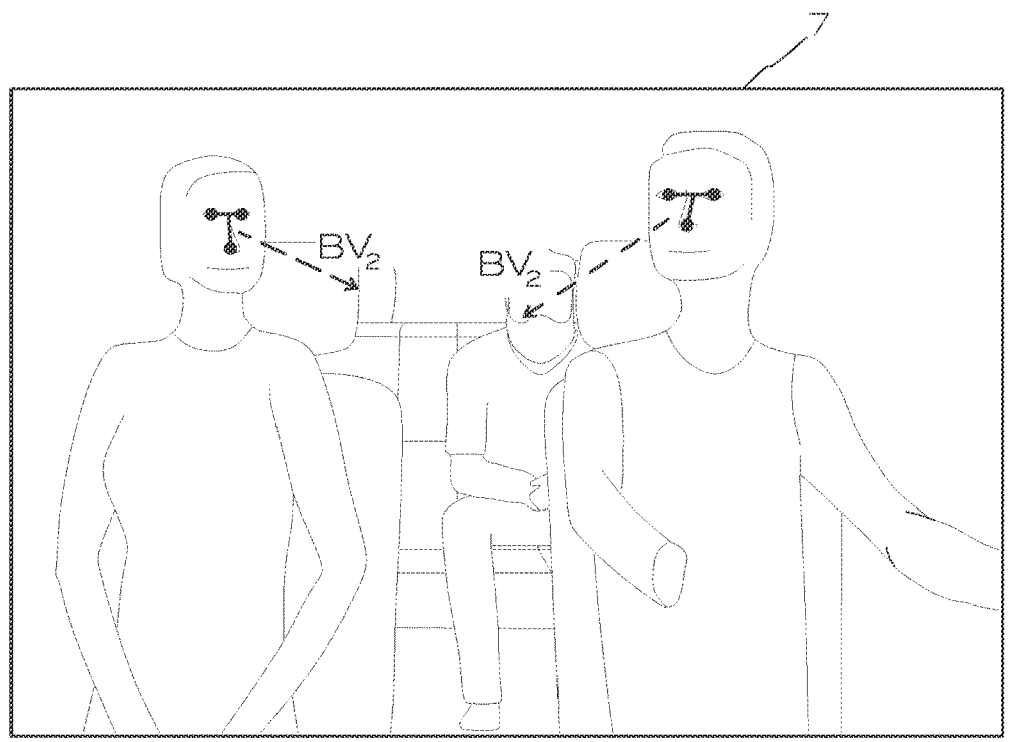

FIG. 3b shows another photograph 7 of the interior 2 after the persons have been asked to focus on another vertex $P_2$ of the attention zone 1. Again, the gaze direction vectors of the driver and the passenger are extracted as gaze direction vectors $BV_2$. Here, too, the extraction can be carried out simultaneously or separately.

Figure 3C:
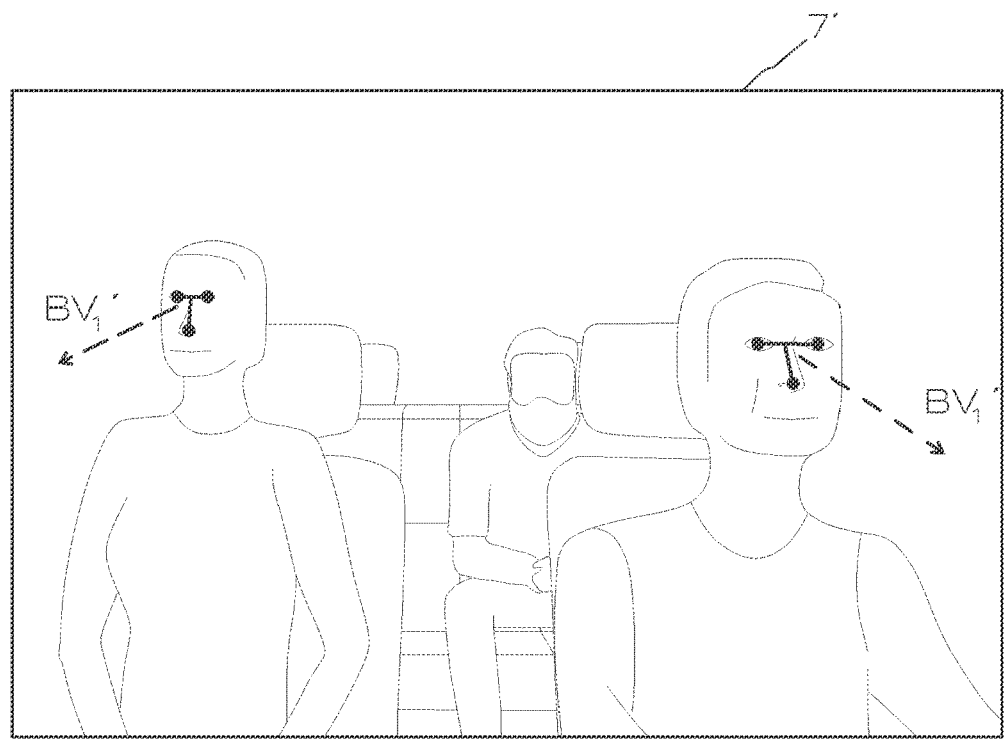

FIG. 3c shows another photograph 7 of the interior 2 after the persons have been asked to change their position and to focus again on the vertex $P_1$ of the attention zone 1. Again, the gaze direction vectors of the driver and the passenger are extracted as gaze direction vectors $BV_1'$.

Figure 3D:
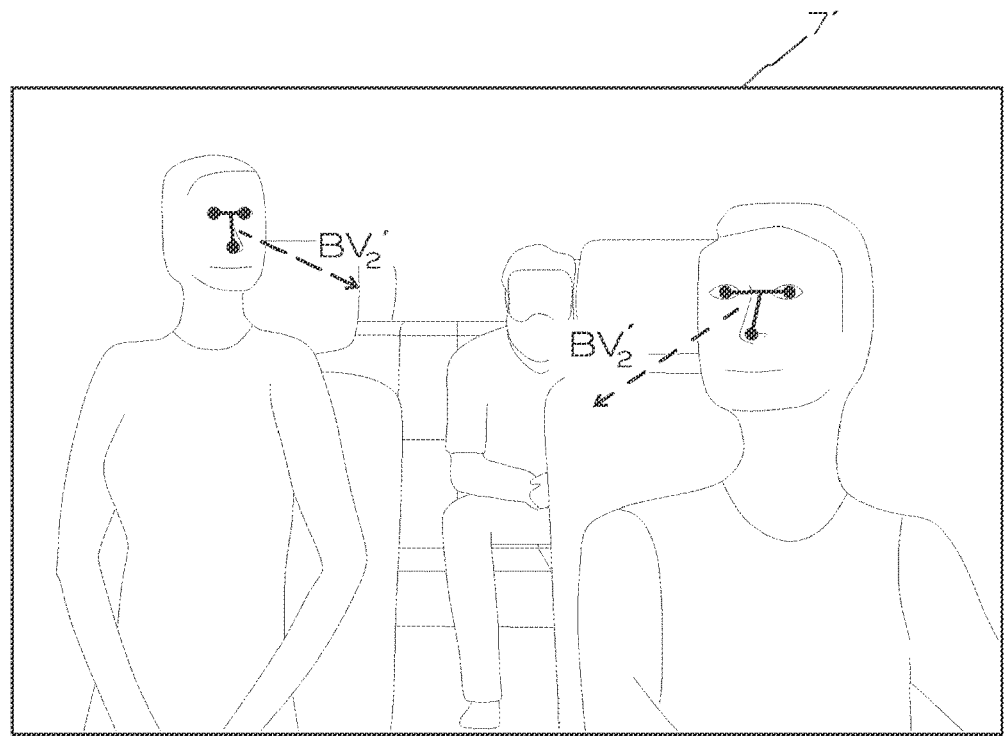

FIG. 3d shows another photograph 7 of the interior 2 after the persons have been asked to focus again on vertex $P_2$ of the attention zone 1. Again, the gaze direction vectors of the driver and the passenger are extracted as gaze direction vectors $BV_2'$.

These steps are repeated for all vertices of the desired polygonal attention zones until sufficient (but at least two different) gaze direction vectors of each person have been extracted for each attention zone to perform triangulation to determine the position of points $P_1$-$P_N$.

Figure 3E:
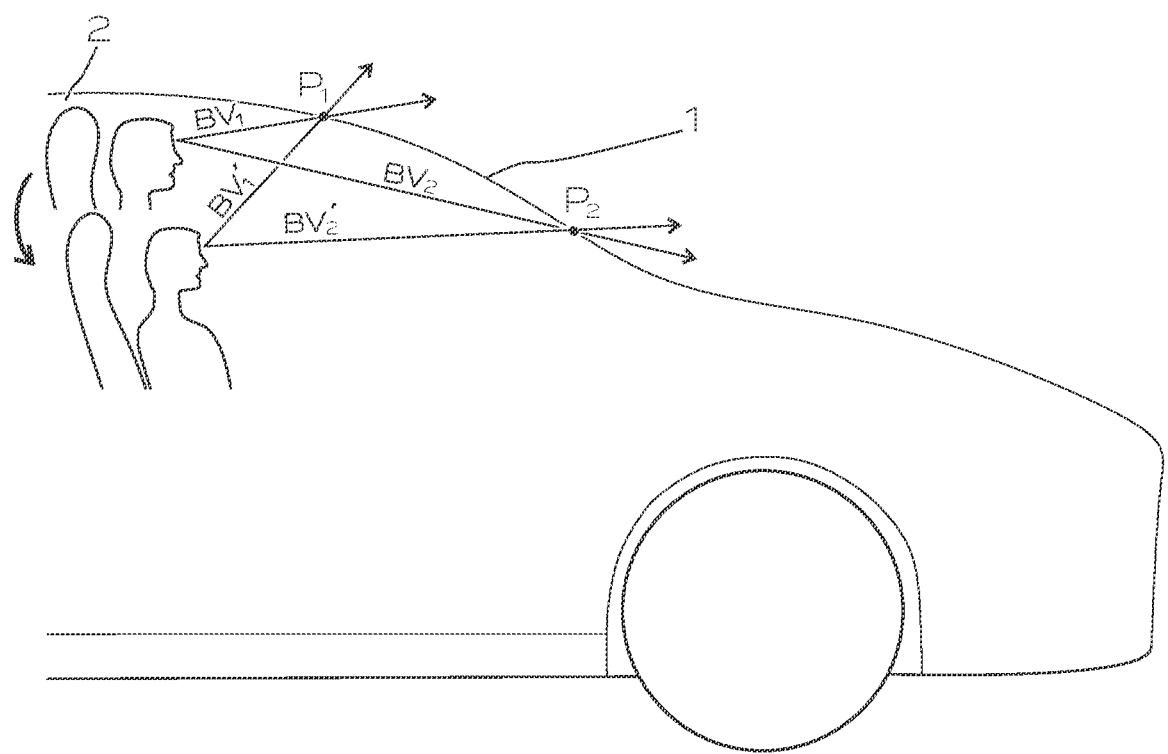
FIG. 3e shows a schematic representation of the determination of the intersection points of two gaze direction vectors of a person.

FIG. 3e shows a schematic representation of the triangulation for determining the intersection points of two gaze direction vectors of a person. Two different sitting positions of the person are suggested, with the gaze direction vectors $BV_1$ and $BV_2$ corresponding to the first sitting position, and the gaze direction vectors $BV_1'$ and $BV_2'$ corresponding to the second sitting position.

By superimposing the gaze direction vectors $BV_1$ and $BV_1'$ or $BV_2$ and $BV_2'$, the intersection points $P_1$ and $P_N$ can be determined, which in this case are vertices of the attention zone 1.

The invention is not limited to the described exemplary embodiments, but also comprises further embodiments of the present invention within the scope of the following patent claims.

LIST OF REFERENCE SIGNS 1, 1', 1", 1''' Attention zone
2 Three-dimensional space
3 Image capturing unit
4 Data processing unit
5 Database
6 Display unit
7 Photograph
8 Vehicle

The invention claimed is:

1. A computer-implemented method for generating multiple geometric attention zones for at least one person in a three-dimensional space with a single image capturing unit, a data processing unit, a database and a display unit, comprising the following steps:
   a. outputting, by the display unit, a request to the person to fixate at least one point in the space corresponding to a vertex of the attention zone to be created,
   b. capturing, by the image capturing unit, a number N of first photographs of the space with the person and extracting, by the data processing unit, a number N of first three-dimensional gaze direction vectors $BV_1$-$BV_N$ of the person, where N is greater than or equal to one,
   c. outputting, by the display unit, a request to the person to change their position in the space and to re-fixate the vertices of the attention zone,
   d. capturing, by the image capturing unit, a number N of second photographs of the space with the person and extracting, by the data processing unit, a number N of second three-dimensional gaze direction vectors $BV_1'$-$BV_N'$ of the person,
   e. superimposing, by the data processing unit, the line of gaze direction vectors $BV_1$-$BV_N$ with the line of gaze direction vectors $BV_1'$-$BV_N'$ in order to determine N three-dimensional intersection points $P_1$-$P_N$,
   f. storing, in the database, an attention zone as a polygon in the space with the vertices $P_1$-$P_N$.

2. The method according to claim 1, wherein the number of vertices N is greater than or equal to three.

3. The method according to claim 1, wherein the space is the interior of a vehicle.

4. The method according to claim 1, wherein the method is repeated to create a plurality of attention zones of a single person.

5. The method according to claim 1, wherein the method is repeated to create a plurality of attention zones of different persons.

6. The method according to claim 1, wherein
a. after generating and storing one or more attention zones of at least one person, the image capturing unit continuously detects the gaze direction vectors of this person and transmits them to the data processing unit, and
b. the data processing unit checks whether the detected gaze direction vectors fall under one of the stored attention zones.

7. The method according to claim 6, wherein
a. the data processing unit calculates a degree of attention of at least one person by determining the frequency with which the detected gaze direction vectors fall under one of the stored attention zones per unit of time, and
b. the display unit outputs a warning message when the level of attention drops below a predefined threshold.

8. A non-transitory computer-readable storage medium storing a program causing a computer to execute the method according to claim 1.

\* \* \* \* \*